Dec. 1, 1931.  J. KIS  1,834,716

UNIVERSAL MACHINE HEAD

Filed Jan. 23, 1930  6 Sheets-Sheet 1

INVENTOR.
John Kis
BY
Morsell, Kenny, Morsell
ATTORNEYS.

Dec. 1, 1931. J. KIS 1,834,716
UNIVERSAL MACHINE HEAD
Filed Jan. 23, 1930 6 Sheets-Sheet 3

INVENTOR.
John Kis
BY
Morsell, Kenney & Morsell
ATTORNEYS.

Dec. 1, 1931.  J. KIS  1,834,716
UNIVERSAL MACHINE HEAD
Filed Jan. 23, 1930   6 Sheets-Sheet 4

INVENTOR.
John Kis
BY
Morsell, Kenney & Morsell
ATTORNEYS.

Dec. 1, 1931.  J. KIS  1,834,716
UNIVERSAL MACHINE HEAD
Filed Jan. 23, 1930   6 Sheets-Sheet 5

INVENTOR.
John Kis
BY
Morsell, Henney & Morsell
ATTORNEYS.

Dec. 1, 1931.  J. KIS  1,834,716
UNIVERSAL MACHINE HEAD
Filed Jan. 23, 1930   6 Sheets-Sheet 6

INVENTOR.
John Kis
BY
Morrell, Finney & Morrell
ATTORNEYS

Patented Dec. 1, 1931

1,834,716

UNITED STATES PATENT OFFICE

JOHN KIS, OF RACINE, WISCONSIN

UNIVERSAL MACHINE HEAD

Application filed January 23, 1930. Serial No. 422,791.

This invention relates to improvements in universal machine heads more particularly adapted for mounting on the shaft of a boring machine, a vertical machine, a milling machine or similar types of spindle machines in which the work remains stationary and the tools turn therearound.

It is one of the objects of the present invention to provide a universal machine head which is adapted for boring inside and outside tapers, turning outside taper hubs, turning perfect radii, under cutting or for forming straight or bevel faces, and so forth.

A further object of the invention is to provide a universal machine head in which the portion of the head holding the cutting tool may be accurately adjusted to any angle desired or held in straight position for other kinds of work.

A further object of the invention is to provide a universal machine head having means for adjusting the various parts of the head positioned and arranged for easy control and to maintain the parts in adjusted position.

A further object of the invention is to provide a universal machine head which, for the class of work performed, is of very simple construction and is well adapted for the purpose described.

With the above and other objects in view the invention consists of the improved universal machine head and its parts and combinations as set forth in the claims, and all equivalents thereof.

In the accompanying drawings in which the same reference characters indicate the same parts in all of the views.

Referring to the drawings the numeral 5 indicates the main casing or body portion of the universal machine head which is provided with a threaded bore 6 for attachment to the rotary member of a boring or other machine (not shown). The opposite end portion of the body is formed with an elongated slot 7 for receiving a boring bar member 8 having a tool holder 9 mounted at its outer end. The tool holder 9 is provided with opposite trunnion bolts 10 for pivotally adjustably connecting the holder to the boring bar 8. Nuts 11 threaded on the trunnion bolts clamp the holder 9 in adjusted position. To permit lateral adjustment of the holder 9 a tool holding block portion 12 is transversely slidably mounted in the holder 9 and the bore in the block for holding the tool 13 is in alinement with an elongated slot 14 formed in the tool holder 9 and through which the tool 13 extends. A screw 13′ holds the tool in position. A socket screw 15 journaled in the tool holder 9 and having a half threaded engagement with the block portion 12 moves and holds the block portion in the desired position of adjustment. A pin 16 entering an annular groove 17 in the socket screw holds the screw against longitudinal movement.

The boring bar 8 is of rectangular form in cross-section and slidably extends into the elongated slot or pocket 18 of the bar holder or bearing 19 which is swiveled in the slotted portion of the body 5 by comparatively large laterally extending trunnions 20 and 21. Said trunnions are rigidly connected to the opposite side portions of the bar holder 19 by screws 22, and said trunnions are journaled in bearing recesses 23 formed in the bar holder 19.

Figure 6:
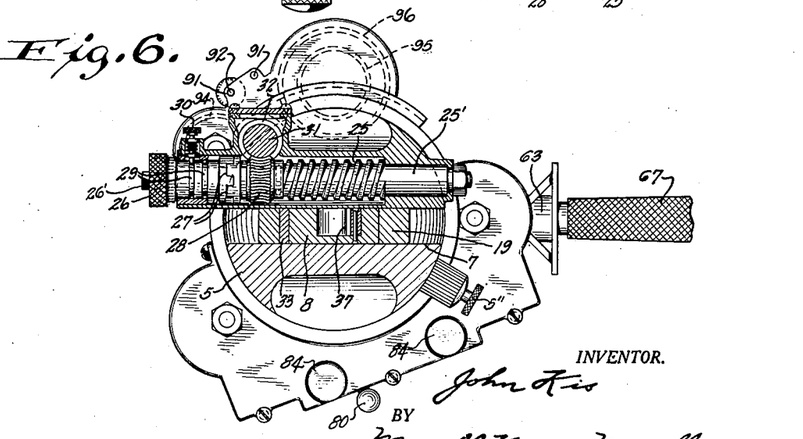
Fig. 6 is a similar view taken on line 6—6 of Fig. 1.

The trunnion 21 has peripheral worm wheel teeth 24 which are in mesh with a transverse worm means 25 for changing the angle of the boring bar 8. A clutch member 26, positioned above and in axial alinement with and splined to the shaft 25′ of the worm 25, has clutch teeth 27 at its lower end which are adapted to engage the cooperating clutch face of a worm wheel 28 journaled on the shaft 25′ to lock said worm wheel 28 to the shaft. The clutch member is formed with two annular grooves 29 which are adapted to be engaged respectively by the yielding pin 30 to hold the clutch in either clutching or unclutching position as clearly indicated in Fig. 6.

A longitudinally extending worm shaft 31 positioned alongside of the transverse worm shaft 25 is formed with a worm 32 which is in constant mesh with the worm wheel 28 and turns the same.

To maintain a snug fit between the boring bar 8 and the holder 9, a gib key 33, controlled by an adjusting screw 34, is provided to take up wear. A removable plate 19′ is secured to the bearing 19 by a pin and slot means 19″ to prevent foreign matter entering the slot 35 when the tool holder is in its outer position.

The boring bar 8 is formed with an elongated side recess 35 to receive a pinion 36 which is in mesh with a rack bar 37 mounted along one side of the recess 35. A portion of the rack teeth of the rack bar terminate short of the inner end of the elongated recess as indicated by the numeral 37′, so that the parts will not be damaged when the recessed end portion of the bar 8 reaches the pinion 36 and the pinion is further turned. When in said disengaging position it is necessary to provide means for engaging the rack with the pinion and to accomplish this, a supplemental pinion 38 is positioned on the inner end of the pinion 36 and forms part of a shaft 38′ which is journaled in and extends through the tubular shaft 39 forming part of the pinion 36. The outer end of the pinion shaft 38′ is squared to receive a socket wrench to move the bar rack into mesh with the pinion 36.

A hand wheel 40 slidably keyed to an outer portion of the tubular pinion shaft 39 is formed with a tapered hub portion 40′ which engages a correspondingly shaped recess 41 formed in a worm wheel 42. The worm wheel is journaled on the tubular shaft 39 between the conical hub 40′ and a shouldered portion 43 formed on the said shaft 39 to clamp the worm wheel to the shaft. Said worm wheel 42 is in mesh with and rotated by a worm 44 forming part of the shaft 31. A thumb nut 45 threaded on the outer end portion of the tubular shaft 39 is also threaded into and bears against the hand wheel 40 to clamp the worm wheel 42 to said tubular shaft 39, so that the worm wheel will transmit motion to the tubular shaft and its pinion 36. When the thumb nut is loosened the hand wheel 40 may be turned to longitudinally adjust the boring bar. A casing part 5′ encloses the worm wheel 42.

The outer portion of the trunnion 21 is provided with an annular groove 46 of T-shape in cross-section for receiving the head of a bolt 47 which extends through the side wall of the body or casing and has a nut on its outer end to clamp the trunnion and connected boring bar in adjusted position.

The trunnion 20 on the opposite side of the boring bar 8 has a portion 48 of reduced diameter which extends through the body or casing part and is engaged by a bevel protractor dial 49 having a degree scale 50 delineated thereon to indicate the angle of the boring bar 8. A scale 50′ on the casing 5 may also be used in connection with the scale 50 on the dial 49 to divide the degrees into minutes to secure a very fine vernier reading and adjustment of the parts. A mark or point 51 on the casing or body coacts with the dial scale in indicating the angle of the boring bar. Pins 52 connect the dial to the trunnion 20 and a screw 53, having a large milled head, extends through the dial and is threaded into the trunnion to clamp the dial and the boring bar 8 in adjusted position. A coiled spring 54 extending into the bore of the screw and interposed between the screw and the trunnion 20 serves to maintain the screw in adjusted position.

A set screw 55 threaded through one portion of the body and engaging an interposed block 56 between the screw and the boring bar 8, firmly clamps the boring bar in adjusted position.

Referring to the parts just described and assuming that it is desired to bore a tapered hole in a piece of work, the work is clamped to the machine in the ordinary manner and the clutch member 26 is pulled upwardly to disengage its clutch teeth 27 from the complementary clutch member forming part of the worm 28. The nut of the bolt 47 and the screw 53 are now loosened to permit movement of the tool holder 8 and a socket wrench is engaged with the squared end 26' of the shaft 25'. The shaft 25' is then turned to turn the dial 49 approximately to the desired degree. After this adjustment has been made, the dial is turned to the desired degree and the nut of the bolt 47 and the screw 53 are tightened to clamp the boring bar and the dial in position. To secure an adjustment of one thousandth of a degree the hand wheel 40 is turned and the bar 8 is slid outwardly. A standard indicator is now applied to the side of the bar and the computation is made according to trigonometric figures to the thousandth part of a degree to get the above accurate setting. The tool 13 for the cutting is secured to the adjustable block 12.

Figures 1, 2:
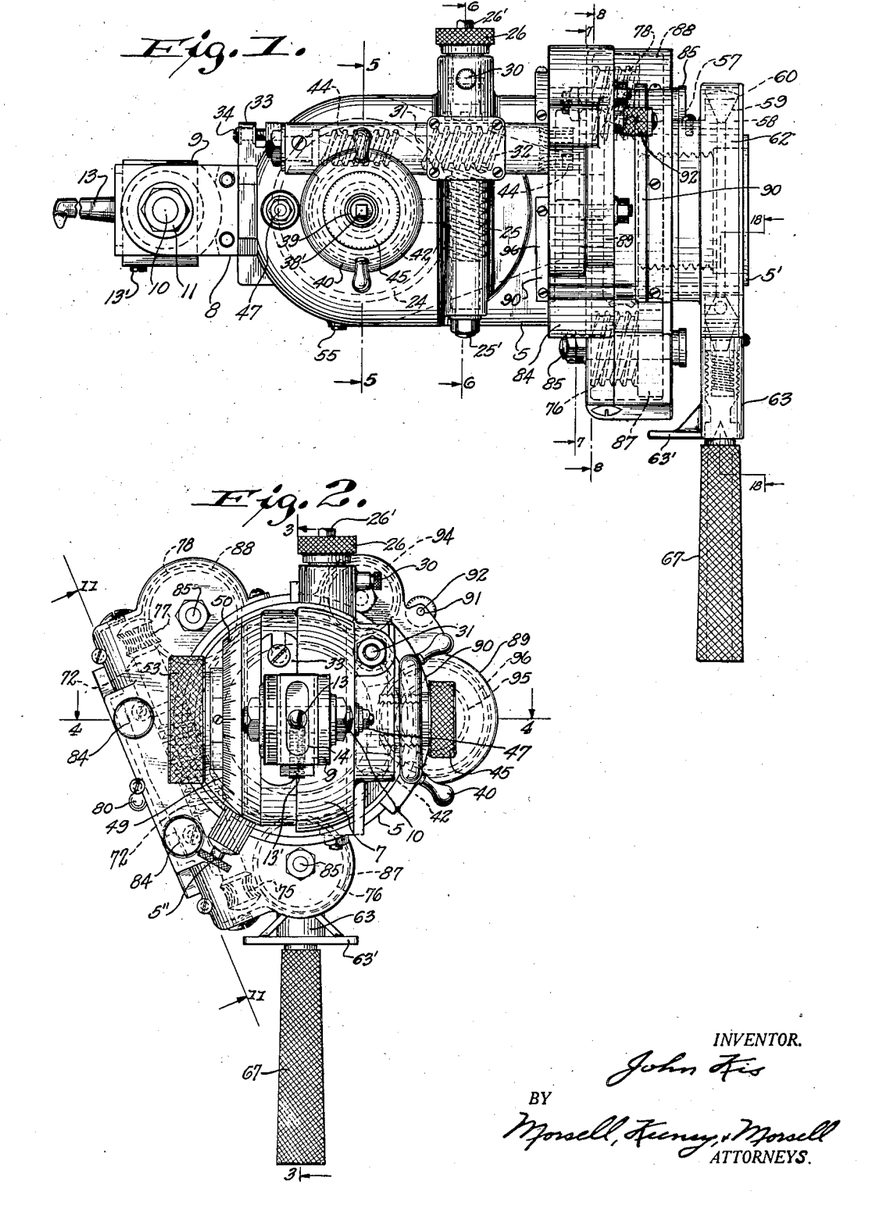
Fig. 1 is a side view of the improved universal machine head showing a cutting tool therein.
Fig. 2 is a front view thereof.
Figure 3:
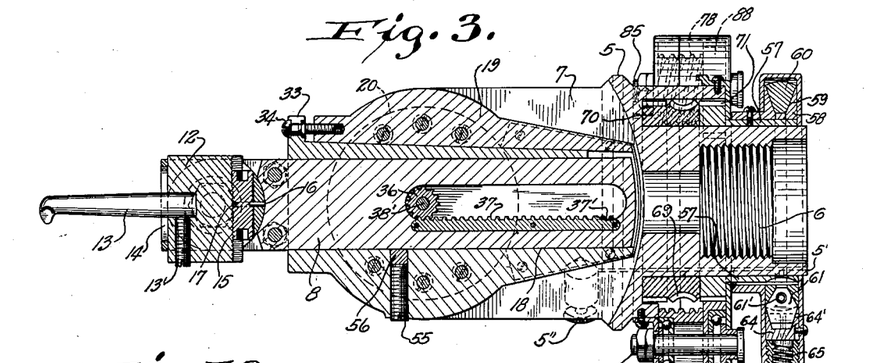
Fig. 3 is a central vertical longitudinal sectional view of the head taken on line 3—3 of Fig. 2.
Figures 4, 18:
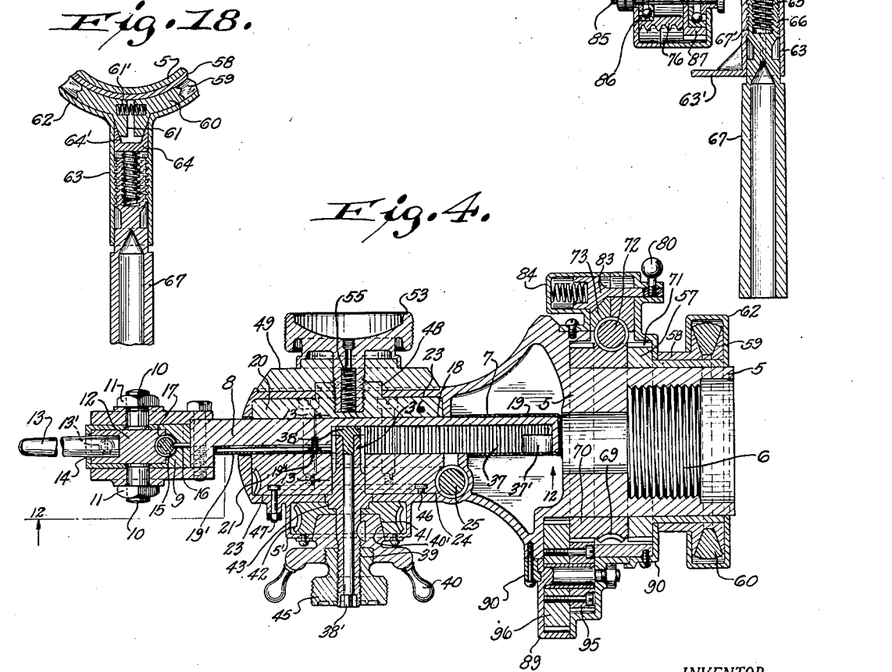
Fig. 4 is a horizontal longitudinal sectional view taken on line 4—4 of Fig. 2.
Fig. 18 is a sectional detail view of the handle clutch mechanism taken on line 18—18 of Fig. 1.
Figures 5, 17:
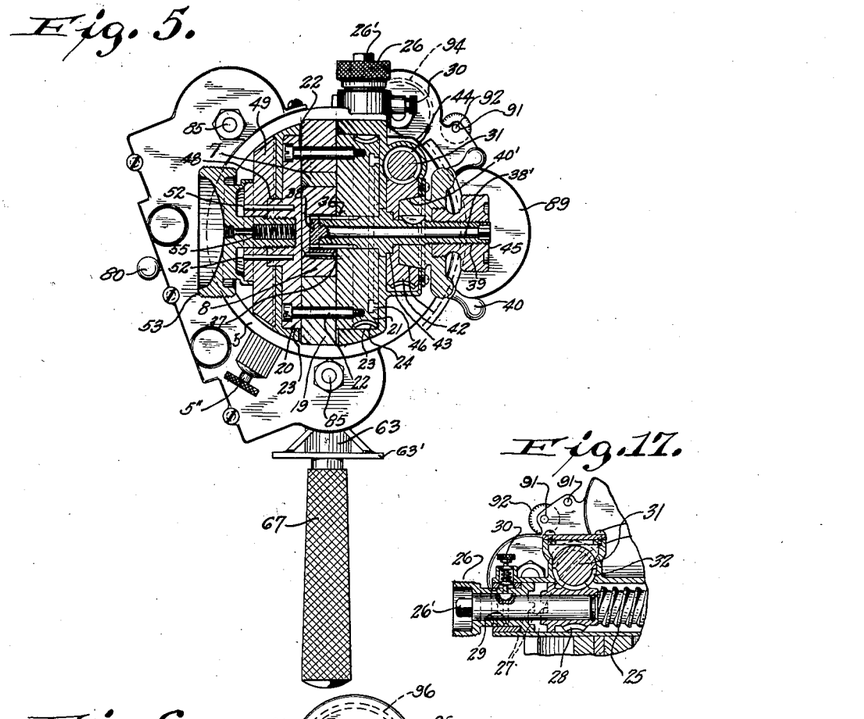
Fig. 5 is a vertical transverse sectional view of the head taken on line 5—5 of Fig. 1.
Fig. 17 is a sectional detail view of clutch other parts shown in Fig. 6.

A gear sleeve 57 journaled on the inner part of the body portion has mounted fast thereon a brake wheel 58 which is provided with a V-shaped groove 59 to receive a brake band 60 of V-shape in cross-section. The brake band at one point is provided with a radially extending conical shaped projection 61, and both band and projection are split radially transversely to space the portions a slight distance apart as shown in Fig. 18. A coiled spring 61' holds the conical portions yieldingly in spaced position. A casing 62 encloses the brake wheel and brake band and has a depending tubular extension 63 which extends around the tapered portion 61. A clamping member 64 slidably positioned within the tubular extension is formed with a conical bore 64' into which the conical projection 61 extends. Said clamping member is provided with a threaded end extension 65 which enters the internal threaded end 66 of a handle member 67. The inner end of the handle member extends into the tubular extension and has an external thread 67' which engages a threaded portion 68 of the handle member 67. The threads between the handle member and the extension 63 extend in a reverse direction and are of a different pitch than the threads between the handle member and the end extension 65 to move the clamping member into and out of clamping position. When moved inwardly to clamping position the brake band will be tightened around the gear sleeve sufficiently to retard or stop the rotation of said gear sleeve as desired. A projection 63' serves as a guard to prevent the hand from slipping towards the rotary casing. The gear sleeve 57 extends adjacent a worm wheel 69 and a feed gear 70, journaled on the tubular end portion of the casing 5, and has a clutch gear 71 positioned on the inner side of the worm wheel 69. The clutch gear 71 is preferably formed integral with the sleeve 69 while the feed gear 70 is preferably formed integral with the worm wheel 69.

Figure 11:
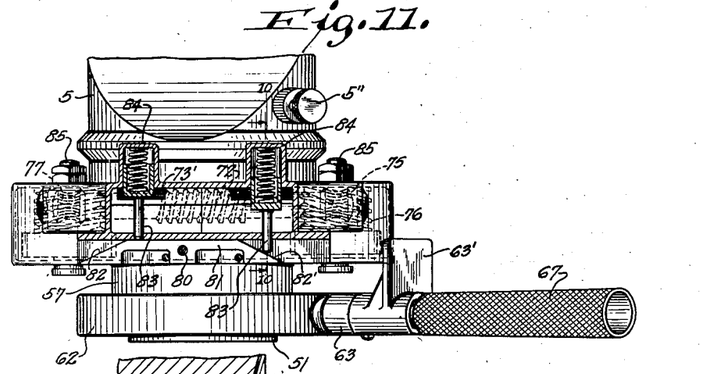
Fig. 11 is a sectional view of the head taken on line 11—11 of Fig. 2.
Figure 12:
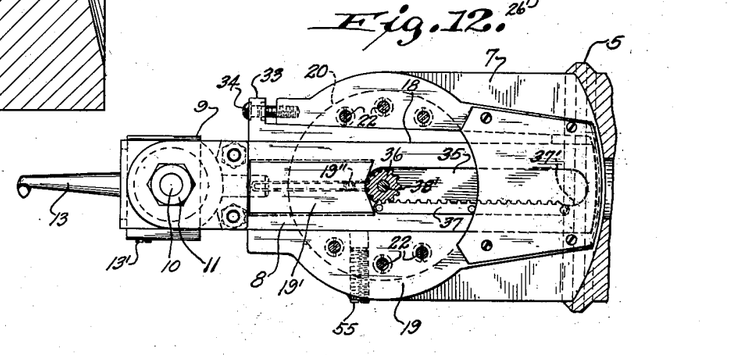
Fig. 12 is a longitudinal sectional view of the head taken on line 12—12 of Fig. 4.
Figure 13:
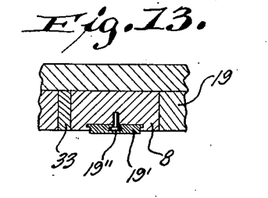
Fig. 13 is a sectional detail view taken on line 13—13 of Fig. 4.
Figure 14:
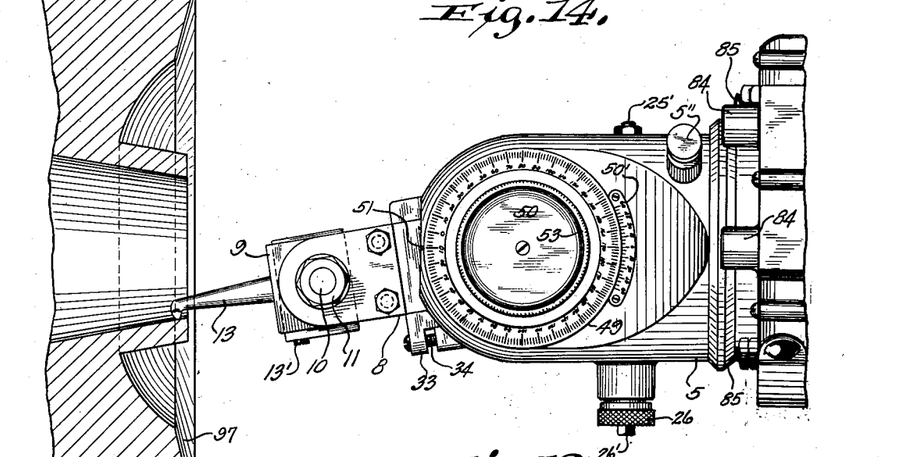
Fig. 14 is a side view of a portion of the head opposite to the side shown in Fig. 1, the view also showing a section of work engaged by the tool mounted in the head.

A worm rock shaft 72 journaled in a bearing 73 is provided with a medial worm 74 which is in mesh with the worm wheel 69. One outer end portion of the rock shaft 72 has a worm wheel 75 formed thereon which, when the shaft 72 is rocked in one direction, will mesh with the worm 76, while the opposite end portion of said rock shaft is provided with a worm wheel 77 which will mesh with a worm 78 when the shaft 72 is rocked in the opposite direction. The rock shaft bearing 73 is journaled for slight rocking movement in the casing by means of curved bearing extensions 79. A projecting knob 80 for manual operation controls the rocking of the rock shaft and is connected to a cam member 81 having opposite end cam faces 82 and 82' which are yieldingly engaged by spring pressed plungers 83 carried by tubular portions 84 of the casing 5. Said plungers 83 have medial cam portions 83' which engage cam side portions 73' of the rock shaft bearing 73. When the knob 80 has been manually moved to the left, referring to Fig. 11, the right hand plunger 83 will be moved downwardly on the cam face 82' and the cam portion 83' of the plunger will engage the cam portion 73' of the rock shaft bearing 73 and rock the said bearing to engage the worm 75 with the worm wheel 76 and at the same time disengage the worm 77 from the worm wheel 78. As the cam 83' of the plunger to the left is free from engagement with the cam portion 73' of the bearing 73 the said left plunger 83 will move downwardly sufficiently far to cause the straight side portion of the plunger to engage the straight side portion of the bearing 73 and lock the said bearing in adjusted position until the knob 80 is again manually moved. The adjustment just mentioned will cause the feed bar 8 to move outwardly, while the other adjustment will cause the bar to move inwardly.

The worms 76 and 78 are journaled on short bolt shafts 85 which have interposed ball bearings 86 to decrease friction. Gear wheels 87 and 88 are respectively mounted fast on the inner side of the worms 76 and 78 and turn therewith. Said gear wheels 87 and 88 are in mesh with the sleeve gear 71 and are rotated thereby to transmit rotation to the rock shaft 72 in one direction or the other depending upon the adjustment of the knob 80.

Figures 7, 8, 9, 10, 15, 16:
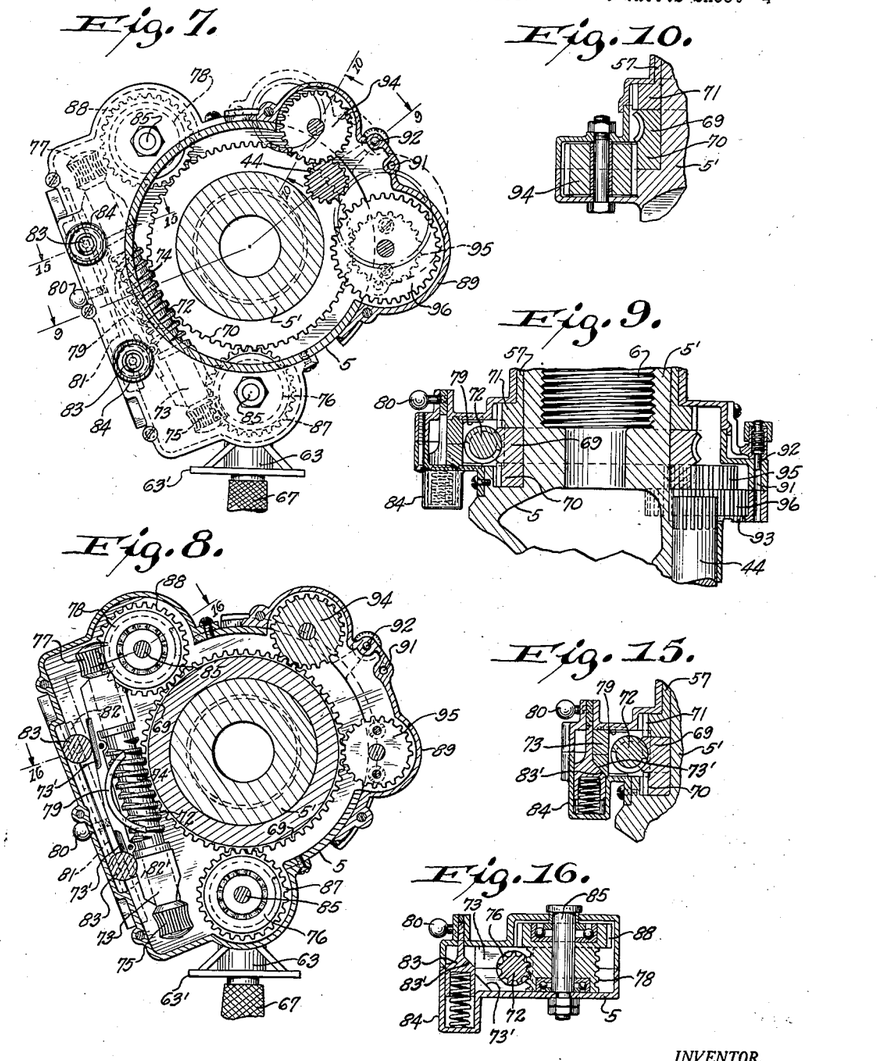
Fig. 7 is a vertical transverse sectional view of the head taken on line 7—7 of Fig. 1.
Fig. 8 is a vertical transverse sectional detail view taken on line 8—8 of Fig. 1.
Fig. 9 is a horizontal sectional detail view taken on line 9—9 of Fig. 7.
Fig. 10 is a sectional detail view taken on line 10—10 of Fig. 11.
Fig. 15 is a fragmentary detail view of a side portion of the head showing a modified form of tool holder.
Fig. 16 is a similar view showing another modified form of tool holder.

A supplemental casing part 89 adjustably mounted on the casing 5 in grooved ways 90 is formed with two side openings 91 which are respectively engaged by a yielding locking pin 92 to hold the supplemental casing in adjusted position. The pin 92 is supported from a relatively fixed portion of the casing 5. The said casing part 89 is adjusted circumferentially around the casing 5 and is provided with an elongated side opening 93 through which extends the pinion end portion 44 of the worm shaft 31. A pinion 94 of greater tooth length than the gear 70 is journaled in the supplemental casing 89 and is in constant mesh with said gear 70 and the supplemental casing may be moved to cause the pinion 94 to mesh with the pinion 44 for a fine feed of the cutting tool 13, see Fig. 7. Another pinion 95 of the same tooth length as the gear 70 is journaled in the supplemental casing 89 and is also in constant mesh with the gear 70 and is rotated thereby. A pinion 96 within the supplemental casing and rigidly connected to the pinion 95 is positioned in the same plane as the pinion 44 so that when the said casing 89 is moved to one of its two positions of adjustment the pinion 96 will mesh with the worm shaft pinion 44 and rotate same more rapidly than the pinion 94 to provide a coarser feed of the cutting tool 13. As before mentioned, the latch pin 91 holds the supplemental casing and the pinions in adjusted position.

The numeral 5″ indicates a grease cup for lubricating the parts.

A piece of work is indicated by the numeral 97.

Figures 19, 20:
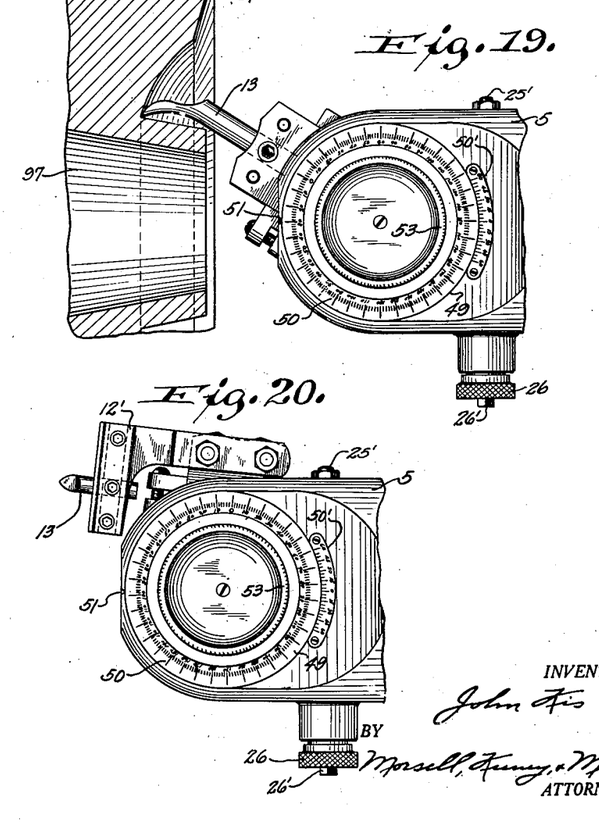
Fig. 19 is a side view of a fragment of the improved universal machine head, showing the cutting tool cooperating with a piece of work.
Fig. 20 is a similar side view of the same fragment of the machine head, showing the cutting tool in a different position of adjustment.

In the form shown in Fig. 20 a modified form of tool holder 12′ is connected to the boring bar 8 and the tool 13 is connected thereto for some kinds of work.

In use the handle member is held to cause the rotation of the gears and worms to move the boring bar 8 outwardly or inwardly, and when it is desired to move the cutting tool 13 radially to cut a curved surface, the thumb nut 45 and the nut of the clamping bolt 47 are loosened to stop the transmission of motion to the rack bar 37, while permitting the bar holder 19 to be turned by the worm wheel 21. This adjustment will cause the tool holder to describe an arc while the head is turning. To adjust the angle of the cutting tool the clutch knob 26 is pulled outwardly and a socket wrench is connected to the squared end of the worm shaft 26′ and the shaft is turned to the desired extent. The squared end 38′ of the shaft of the pinion 38 provides for manual adjustment of the boring bar 8 when the thumb nut 45 is loosened.

From the foregoing description it will be seen that the universal machine head is adapted to all kinds of work and may be easily connected to the spindles of standard boring, vertical, milling or other similar machines, and is well adapted for the purpose described.

What I claim as my invention is:

1. A universal machine head, comprising a casing having means for connection to a revoluble shaft, a tool holding bar member slidably carried by the casing, gearing carried by the casing and connected to the tool holding bar member, and means for holding a portion of the gearing while the head is turning and under one adjustment to feed the tool holding bar member forwardly and under a different adjustment to interchangeably move the said tool holding bar member rearwardly.

2. A universal machine head, comprising a casing having means for connection to a revoluble shaft, a tool holding bar member pivotally associated with said casing, gearing carried by the casing and connected to the tool holding bar member, and means for holding a portion of the gearing while the head is turning to cause the turning of another portion of the gearing for moving the tool holding bar member in an arc.

3. A universal machine head, comprising a casing having means for connection to a revoluble shaft, a tool holding bar member slidably and pivotally associated with said casing, gearing carried by the casing and connected to the tool holding bar member, means for holding a portion of the gearing while the head is turning to cause other portions of the gearing to gradually feed the tool holding bar member forwardly or rearwardly or in an arc.

4. A universal machine head, comprising a casing having means for connection to a revoluble shaft, a tool holding bar member slidably and pivotally associated with said casing, gearing carried by the casing and connected to the tool holding bar member, means for holding a portion of the gearing while the head is turning to cause other portions of the gearing to move the tool holding bar member forwardly or rearwardly or in an arc, means controlling the forward or rearward movement of the tool holding bar member, and other means controlling the movement of the tool holding bar member in an arc.

5. A universal machine head, comprising a casing having means for connection to a revoluble shaft, a tool holding bar member slidably and pivotally associated with said casing and having rack teeth along one portion, gearing carried by the casing and including worms and worm wheels and a pinion in mesh with the rack teeth, means for holding a portion of the gearing while the head is turning to cause other portions of the gearing to move the tool holding bar member forwardly or rearwardly or in an arc, shiftable gears for changing the feed of the tool holding bar member, and a worm and worm wheel means connected to the gearing for moving the tool holding bar member in an arc.

6. A universal machine head, comprising a casing having means for connection to a revoluble shaft and a forwardly extending elongated slot, a bar holding member journaled in the slotted portion of the casing, a bar member slidably carried by the bar holding member and having rack teeth along one portion and a tool holder at its forward end, gearing carried by the casing and including a pinion in mesh with the rack teeth and a worm gear connection with the bar holding member, shiftable gears for changing the rate of feed of the bar member, a worm and worm means connected to the gearing for moving the tool holding bar member in an arc, and means for holding a portion of the gearing stationary while the head is turning to cause the other portion of the gearing to rotate.

7. A universal machine head, comprising a casing having means for connection to a revoluble shaft and a forwardly extending elongated slot, a bar holding member journaled in the slotted portion of the casing, a bar member slidably carried by the bar holding member and having rack teeth along one portion and a tool holder at its forward end, gearing carried by the casing and including a pinion in mesh with the rack teeth and a worm gear connection with the bar holding member, shiftable gears for changing the rate of feed of the bar member, a worm and worm means connected to the gearing for moving the tool holding bar member in an arc, a worm and worm wheel means connected to the gearing for moving the tool holding bar member in an arc, and means for holding a portion of the gearing stationary while the head is turning to cause the other portion of the gearing to rotate.

8. A universal machine head, comprising a casing having means for connection to a revoluble shaft and a forwardly extending elongated slot, a bar holding member journaled in the slotted portion of the casing, a bar member slidably carried by the bar holding member and having rack teeth along one portion and a tool holder at its forward end, gearing carried by the casing and including a pinion in mesh with the rack teeth and a worm gear connection with the bar holding member, shiftable gears mounted on one side portion of the casing for changing the rate of feed of the bar member, a worm wheel connected to one side of the bar holding member, said gearing including a worm which is in mesh with the bar holding member worm wheel for moving the said bar holding member in an arc, and means for holding a portion of the gearing stationary while the head is turning to cause the other portion of the gearing to rotate.

9. A universal machine head, comprising a casing having means for connection with a revoluble shaft and a forwardly extending elongated slot, a bar holding member having side trunnions journaled in the slotted portion of the casing, one of said trunnions being in the form of a worm wheel, a bar member slidably carried by the bar holding member and having rack teeth along one portion and a tool holder at its forward end, gearing carried by the casing and including a pinion in mesh with the rack teeth and a worm in mesh with the trunnion worm wheel, shiftable gears mounted on one side portion of the casing for changing the rate of feed of the bar holding members, and means for holding a portion of the gearing stationary while the head is turning to cause the other portion of the gearing to rotate.

10. A universal machine head, comprising a casing having means for connection with a revoluble shaft and a forwardly extending elongated slot, a bar holding member having side trunnions journaled in the slotted portion of the casing, one of said trunnions being in the form of a worm wheel, a bar member slidably carried by the bar holding member and having rack teeth along one portion and a tool holder at its forward end, gearing carried by the casing and including a pinion in mesh with the rack teeth and a worm in mesh with the trunnion worm wheel, shiftable gears mounted on one side portion of the casing for changing the rate of feed of the bar holding members, a rock shaft means for reversing the direction of movement of the bar member, a yielding means for moving the rock shaft to either of its positions of adjustment, a cam means controlling the movement of the yielding means, and means for holding a portion of the gearing stationary while the head is turning to cause the other portion of the gearing to rotate.

11. A universal machine head, comprising a casing having means for connection to a revoluble shaft, a tool holding bar member slidably carried by the casing, gearing carried by the casing and connected to the tool holding bar member, a rock shaft means for reversing the direction of movement of the bar member, a yielding means for moving the rock shaft to either of its positions of adjustment, a cam means controlling the movement of the yielding means, and means for holding a portion of the gearing while the head is turning to feed the tool holding bar member forwardly.

12. A universal machine head, comprising a casing having means for connection to a revoluble shaft, a tool holding bar member slidably carried by the casing, a gearing carried by the casing and connected to the tool holding bar member, a rock shaft means for reversing the direction of movement of the bar member, a yielding means for moving the rock shaft to either of its positions of adjustment, a cam means controlling the movement of the yielding means, and means for holding a portion of the gearing while the head is turning to cause the turning of another portion of the gearing for moving the tool holding bar member in an arc.

13. A universal machine head, comprising a casing having means for connection to a revoluble shaft and a forwardly extending elongated slot, a bar holding member journaled in the slotted portion of the casing, a bar member slidably carried by the bar holding member and having rack teeth along one portion and a tool holder at its forward end, gearing carried by the casing and including a pinion in mesh with the rack teeth and a worm gear connection with the bar holding member, shiftable gears for changing the rate of feed of the bar member, a worm and worm means connected to the gearing for moving the tool holding bar member in an arc, a rock shaft means for reversing the direction of movement of the bar member, a yielding means for moving the rock shaft to either of its positions of adjustment, a cam means controlling the movement of the yielding means, and means for holding a portion of the gearing stationary while the head is turning to cause the other portion of the gearing to rotate.

14. A universal machine head, comprising a casing having means for connection with a revoluble shaft and a forwardly extending elongated slot, a bar holding member having side trunnions journaled in the slotted portion of the casing, one of said trunnions being in the form of a worm wheel, an indicating dial positioned on the outer side of the casing and turning with the bar holding member, a bar member slidably carried by the bar holding member and having rack teeth on one edge portion and a tool holder at its forward end, a pinion in mesh with the rack teeth, a worm wheel releasably connected to the pinion, worms in mesh with the worm wheels a clutch and a feed gear wheel journaled on the casing, the clutch gear wheel having an extension sleeve portion and the feed gear having a worm wheel connected thereto, a holding means engaging the extension sleeve for holding the sleeve gear against rotation, a worm and worm wheel rock shaft in mesh with the feed gear worm wheel, pinions in mesh with the clutch gear and having worms connected thereto which are engaged by the worm wheels of the rock shaft, change speed gearing in mesh with the feed gear and having a driving connection with the shaft of the worm in mesh with the worm wheel releasably connected to the rack pinion, means controlling the adjustment of the rock shaft, and means moving the change speed gears from one position to another.

15. A universal machine head, comprising a casing having means for connection with a revoluble shaft and a forwardly extending elongated slot, a bar holding member having side trunnions journaled in the slotted portion of the casing, one of said trunnions being in the form of a worm wheel, an indicating dial positioned on the outer side of the casing and turning with the bar holding member, a bar member slidably carried by the bar holding member and having rack teeth on one edge portion and a tool holder at its forward end, a pinion in mesh with the rack teeth, a worm wheel releasably connected to the pinion, worms in mesh with the worm wheels, a clutch and a feed gear wheel journaled on the casing, the clutch gear wheel having an extension sleeve portion and the feed gear having a worm wheel connected thereto, a holding means engaging the extension sleeve for holding the sleeve gear against rotation, a worm and worm wheel rock shaft in mesh with the feed gear worm wheel, pinions in mesh with the clutch gear and having worms connected thereto which are engaged by the worm wheels of the rock shaft, change speed gearing in mesh with the feed gear and having a driving connection with the shaft of the worm in mesh with the worm wheel releasably connected to the rack pinion, yielding means for moving the rock shaft to either of its positions of adjustment, cam means controlling the movement of the yielding means, said change speed gearing being journaled in a supplemental slidable casing, and means for holding the supplemental casing in adjusted position.

16. A universal machine head, comprising a casing having means for connection with a revoluble shaft and a forwardly extending elongated slot, a bar holding member having side trunnions journaled in the slotted portions of the casing, one of said trunnions being in the form of a worm wheel, an indicating dial positioned on the outer side of the casing and turning with the bar holding member, a bar member slidably carried by the bar holding member and having rack teeth on one edge portion and a tool holder at its forward end, a pinion in mesh with the rack teeth, a worm wheel releasably connected to the pinion, worms in mesh with the worm wheels, a threaded means for clamping the worm wheel to the pinion, a clutch and a feed gear wheel journaled on the casing, the clutch gear wheel having an extension sleeve portion and the feed gear having a worm wheel connected thereto, a clamping and holding means engaging the extension sleeve holding the sleeve gear against rotation, a worm and worm wheel rock shaft in mesh with the feed gear worm wheel, pinions in mesh with the clutch gear and having worms connected thereto which are engaged by the worm wheels of the rock shaft, change speed gearing in mesh with the feed gear and having a driving connection with the shaft of the worm in mesh with the worm wheel releasably connected to the rack pinion, means controlling the adjustment of the rock shaft, and means moving the change speed gears from one position to another.

17. A universal machine head, comprising a casing having a threaded inner end portion for connection with a revoluble member and also having an outer end elongated slot, a bar holding member medially journaled in the slotted portion of the casing, an indicating dial positioned on the casing and turning with the bar holding member, a bar member slidably mounted in the holding member and having an adjustable tool holder at its outer end and rack teeth along one of its inner edges, a pinion in mesh with the rack teeth and having its shaft extending outwardly in axial alinement with the journal of the bar holding member, a worm wheel connected to one side portion of the bar holding member, a worm wheel journaled on the pinion shaft, a hand wheel keyed to the pinion shaft and clampingly engaging the worm wheel journaled on said pinion shaft, a thumb nut threaded on the pinion shaft for clamping the hand wheel to the worm wheel on said pinion shaft, a longitudinally extending shaft having a worm in mesh with the pinion shaft worm wheel, said longitudinal shaft having a pinion on the inner end and a worm medially of the length of the shaft, a transverse shaft having a worm portion in mesh with the bar holding member worm wheel, a clutch worm wheel journaled on the transverse shaft and in mesh with the medial worm, a clutch member splined on the transverse shaft for engagement with the clutch worm wheel, change speed gearing engageable with the longitudinal shaft pinion, a clutch gear wheel journaled on the casing, means for clamping the clutch gear against rotation, and gearing means in mesh with the clutch gear and the change speed gearing for rotating the change speed gearing.

18. A universal machine head, comprising a casing having a threaded inner end portion for connection with a revoluble member and also having an outer end elongated slot, a bar holding member medially journaled in the slotted portion of the casing, an indicating dial positioned on the casing and turning with the bar holding member, a bar member slidably mounted in the holding member and having an adjustable tool holder at its outer end and rack teeth along one of its inner edges, a pinion in mesh with the rack teeth and having its shaft extending outwardly in axial alinement with the journal of the bar holding member, a worm wheel connected to one side portion of the bar holding member, a worm wheel journaled on the pinion shaft, a hand wheel keyed to the pinion shaft and clampingly engaging the worm wheel journaled on said pinion shaft, a thumb nut threaded on the pinion shaft for clamping the hand wheel to the worm wheel on said pinion shaft, a longitudinally extending shaft having a worm in mesh with the pinion shaft worm wheel, said longitudinal shaft having a pinion on its inner end and a worm medially of the length of the shaft, a transverse shaft having a worm portion in mesh with the bar holding member worm wheel, a clutch worm wheel journaled on the transverse shaft and in mesh with the medial worm, a clutch member splined on the transverse shaft for engagement with the clutch worm wheel, change speed gearing engageable with the longitudinal shaft pinion, a clutch gear wheel journaled on the casing, means for clamping the clutch gear against rotation, a worm wheel journaled on the casing, a feed gear journaled on the casing and turning with the casing worm wheel, a worm rock shaft in mesh with the casing worm wheel and having worm pinions on its opposite ends, combined worm and gear wheels journaled in the casing and in mesh with the clutch gear and engageable by the pinions of the rock shaft, and means for moving the rock shaft to mesh said gears and worms.

19. A universal machine head comprising a casing having means for connection to a revoluble shaft, a tool holding bar member slidably and radially movably carried by the casing, a clutch gear wheel journaled on the casing and having an extending sleeve, a clutch band extending around the sleeve, means including a handle for clamping the band around the sleeve to retard or stop the rotation of the sleeve, and a gearing between the clutch gear and the tool holding bar member to move said tool holding bar member longitudinally and radially.

20. A universal machine head comprising, a revoluble casing, a tool holder slidably associated with said casing, gearing carried by said casing and coacting with said holder, and means for holding a portion of said gearing while said casing is turning under one adjustment to feed the tool holder forwardly and under another adjustment to interchangeably move the holder rearwardly.

21. A universal machine head comprising, a revoluble casing, a tool holder slidable along said casing, gearing carried by said casing and coacting with said holder, and means for effecting relative rotation of said gearing and casing so that under one adjustment the tool holder is fed forwardly along the casing and under another adjustment the feeding is interchangeably reversed.

22. A universal machine head comprising, a revoluble casing, a tool holder pivotally associated with said casing, gearing carried by said casing and coacting with said holder, and means for effecting relative rotation of said gearing and casing to move said holder in an arc.

23. A universal machine head comprising, a revoluble casing, a tool holder slidably and pivotally associated with said casing, gearing carried by said casing and coacting with said holder, and means for effecting relative rotation of said gearing and casing to interchangeably slide said holder back and forth and to move said holder in an arc.

In testimony whereof, I affix my signature.

JOHN KIS.